United States Patent
Tomlinson (10) Patent No.: US 6,549,865 B2
(45) Date of Patent: Apr. 15, 2003

(54) METHOD OF CONTROLLING A DYNAMIC GAIN CONTROLLER

(75) Inventor: W. John Tomlinson, Princeton, NJ (US)

(73) Assignee: JDS Uniphase Inc., Ottawa (CA)

(*) Notice: Subject to any disclaimer, the term of this patent is extended or adjusted under 35 U.S.C. 154(b) by 152 days.

(21) Appl. No.: 09/805,885

(22) Filed: Mar. 15, 2001

(65) Prior Publication Data

US 2002/0177965 A1 Nov. 28, 2002

(51) Int. Cl.[7] .................................................. G02B 6/34
(52) U.S. Cl. ............................ 702/85; 385/37; 359/237; 359/124
(58) Field of Search ...................... 702/85, 40; 250/334, 250/339.02, 352; 385/37, 370.06, 370.08, 370.09, 252.1, 15, 24, 31, 39, 45; 349/115, 176, 74, 78, 98; 356/328; 359/124, 127, 237, 259

(56) References Cited

U.S. PATENT DOCUMENTS

| 5,805,759 A | * | 9/1998 | Fukushima | .................. 385/140 |
|---|---|---|---|---|
| 5,822,029 A | * | 10/1998 | Davis et al. | ................. 349/115 |
| 5,933,270 A | * | 8/1999 | Toyohara | ................. 359/341.3 |
| 6,088,380 A | * | 7/2000 | Lawandy | ..................... 372/102 |
| 6,188,460 B1 | * | 2/2001 | Faris | ........................... 349/176 |
| 6,300,612 B1 | * | 10/2001 | Yu | .......................... 250/208.1 |
| 6,333,773 B1 | * | 12/2001 | Faris | ........................... 349/176 |

* cited by examiner

Primary Examiner—Bryan Bui
Assistant Examiner—Hien Vo
(74) Attorney, Agent, or Firm—Lacasse & Associates, LLC (57) ABSTRACT

A method of controlling a response function of a pixelated dynamic gain controller involving structuring the problem as a set of linear equations that are used to efficiently and accurately determine an initial set of pixel settings and further can be iterated to determine optimum pixel settings for a desired response function. In particular, the gain controller is comprised of an array of individually controllable pixels such as an array of liquid crystals. Adjusting drive conditions to each pixel controls the relative transmission of a narrow band of wavelengths through each pixel. The target response function is achieved by structuring the control conditions as a set of linear equations with which it is possible to accurately determine an initial set of pixel settings. The settings can be iterated to determine an optimum setting for a desired response function or change in response function. Additionally, compensating pixels at the edges of the array are used to compensate for edge effects.

19 Claims, 9 Drawing Sheets

METHOD OF CONTROLLING A DYNAMIC GAIN CONTROLLER

FIELD OF THE INVENTION

The present invention relates to the field of dynamic gain controllers/equalizers, and more particularly, to methods of controlling optical characteristics of individual pixelated elements in a dynamic gain equalizer having an array of controllable pixelated elements used in optical transmission systems.

BACKGROUND OF THE INVENTION

Optical transmission systems employ wavelength division multiplexing (WDM) to maximize use of a given band of wavelengths. The wavelength band is subdivided into multiple wavelengths or channels with each channel being independently modulated with a digital signal. Typically, the channels are multiplexed into an optical fiber and propagated along a transmission route between end systems.

For transmission paths greater than a certain distance it is necessary to incorporate optical filters at points along the route to compensate for wavelength-dependent system gain and attenuation. Optical fibers and optical amplifiers do not propagate all wavelengths with equal gain and attenuation and in many applications it is necessary to equalize the net gain and attenuation between channels. This can be done utilizing a dynamic gain equalizer (DGE) or gain controller.

Various dynamic gain controllers have been proposed that are based primarily on dispersing input light across an active element, or array of elements, that provide different attenuations in different spectral regions. The light that has been modified by the active element(s) is then undispersed and coupled to an output fiber. Ideally such controllers should be capable of providing a wide range of smoothly varying (low ripple) spectral attenuation functions to compensate for the spectral dependence of gain and attenuation, without distorting the various signal channels.

U.S. Pat. No. 5,805,759 issued Sep. 8, 1998 to Fukushima discloses a system that employs an attenuation plate with a spatially varying attenuation, which is movable in directions perpendicular to the propagation direction of the spectrally-dispersed light, thus varying the attenuation seen by various spectral regions. The Fukushima system is capable of providing a smoothly varying spectral attenuation function, but a given unit can provide only a limited set of such functions. Further, it is not possible to simply adjust the attenuation in a given spectral region using the Fukushima system.

U.S. Pat. No. 5,933,270 issued Aug. 3, 1999 to Toyohara discloses a system that employs a wavelength division multiplexer to couple light in different wavelength bands to different fibers, each of which is equipped with a variable light reflecting means. The Toyohara system is capable of providing a wide range of spectral attenuation functions. However, to avoid interference effects, it is necessary to insure that the wavelength bands do not overlap. As a result, the Toyohara system is not capable of providing a smoothly varying spectral attenuation function.

In an article titled "*Liquid-Crystal-Based Wavelength Selectable Cross-Connect*" by Ranalli et al. presented at ECOC 1999 (25$^{th}$ European Conference on Optical Communication), pages 68–9 vol. 1, published by the Societe des Electriciens et des Electroniciens (SEE) a liquid crystal based wavelength selective cross connect system is described. The Ranalli system employs a pixelated equalizer that uses an array of liquid crystal cells. However, similar to the Toyohara system, the Ranalli system is designed such that the wavelength bands do not overlap and, therefore, is not capable of providing a smoothly varying spectral attenuation function.

In summary, to provide a wide range of spectral attenuation functions, while maintaining a smoothly varying spectral attenuation function, and to provide attenuation adjustability in a given spectral region, it is desirable to use designs where each spectral region is acted upon by more than one of the individual attenuation elements. Applicant's co-pending U.S. application Ser. No. 09/727,446 filed Dec. 4, 2000 describes an example of a dynamic gain flattening filter/dynamic gain equalizer, which discusses the need to have interactions with pixels in more detail.

However, for such equalizers, adjusting one of the attenuation elements will also change the attenuation for adjacent spectral bands, making it difficult to determine the correct settings for the attenuation elements to achieve a desired spectral attenuation function. Prior art in the field of gain controllers has not taught how to control such equalizers to accurately achieve desired smoothly varying attenuation functions without requiring multiple complex calculations and multiple iterations.

SUMMARY OF THE INVENTION

In accordance with one aspect of the present invention there is provided in a system having an array of pixelated elements for controlling incident light thereon, and having a processor for processing control information related to response transmission characteristics of the array of pixelated elements, a method of controlling characteristics of the array of pixelated elements in response to input data comprising the steps of: acquiring calibration information related to the response characteristics of the array of pixelated elements; acquiring a target response function for the array of pixelated elements; converting the target response function into a set of pixel amplitude field linear equations; and determining a set of input data values for controlling the array of pixelated elements based on the calibration information and the pixel amplitude field linear equations.

In accordance with another aspect of the present invention there is provided a method of controlling the optical characteristics of individual pixelated elements in a dynamic gain equalizer having an array of controllable pixelated elements, and having a processor for processing control information related to a response function of the dynamic gain equalizer, said method comprising the steps of: acquiring a predetermined target response function for the array of pixelated elements from a system controller; calculating initial attenuation settings for individual pixels of the array of pixelated elements based on stored data; calculating spectral attenuation that would result from the initial attenuation settings for individual pixels and determining deviations between the initial settings and settings to satisfy said target response; calculating input data for use by said processor to control said individual pixels if said deviations are within set limits; and sending said input data to said processor.

In accordance with another aspect of the present invention there is provided a computer program product for a system having an array of pixelated elements for controlling incident light thereon, and having a processor for processing control information related to response transmission characteristics of the array of pixelated elements, the computer program product comprising computer readable program code devices for controlling characteristics of the array of pixelated elements in response to input data comprising: acquiring calibration information related to the response characteristics of the array of pixelated elements; acquiring a target response function for the array of pixelated elements; converting the target response function into a set of pixel amplitude field linear equations; and determining a set of input data values for controlling the array of pixelated elements based on the calibration information and the pixel amplitude field linear equations.

In accordance with another aspect of the present invention there is provided a computer program product for controlling the optical characteristics of individual pixelated elements in a dynamic gain equalizer having an array of controllable pixelated elements, and having a processor for processing control information related to a response function of the dynamic gain equalizer, the computer program product comprising computer readable program code devices for: acquiring a predetermined target response function for the array of pixelated elements from a system controller; calculating initial attenuation settings for individual pixels of the array of pixelated elements based on stored data; calculating spectral attenuation that would result from the initial attenuation settings for individual pixels and determining deviations between the initial settings and settings to satisfy said target response; calculating input data for use by said processor to control said individual pixels if said deviations are within set limits: and sending said input data to said processor.

In accordance with an exemplary embodiment, the present invention provides a computationally efficient method for controlling the settings of individual pixels of a pixelated dynamic gain controller to achieve a desired spectral response function. In particular, the method of the present invention provides an accurate first estimate of the optimum settings and can be iterated without any external information to converge to the optimum settings. The settings can be adjusted to compensate for the effects of the edges of the pixel array.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Further features and advantages of the present invention will be described in the detailed description, taken in combination with the appended drawings, in which.

DETAILED DESCRIPTION OF EMBODIMENTS OF THE PRESENT INVENTION

By way of background, the present invention is concerned with determining the performance of a dynamic gain equalizer in which input light is spectrally disbursed across a linear array of pixel elements (for example, liquid crystal cells) operating as variable attenuators and the reflected (or transmitted) spectrum is undisbursed and focused on an output fiber. In implementations using variable retarder liquid crystal cells, the beams incident on the liquid crystal pixels are in a fixed linear polarization. The liquid crystal pixels provide a variable rotation of the polarization of the reflected (or transmitted) light and only the component in the polarization of the incident beam couples to the output fiber to provide variable attenuation.

Liquid crystal cells, using nematic liquid crystals, with the rubbing axes on the two plates parallel to each other, provide a variable retarder (or wave plate) functionality. With zero applied voltage the molecules orient themselves parallel to the rubbing axes providing a retarder with its principle axes parallel and perpendicular to the rubbing axes. As a voltage is applied between the electrodes the molecules rotate to align themselves along the field direction.

In general, the present invention structures the control problem as a set of linear equations, which are used to efficiently and accurately determine an initial set of pixel settings, and can efficiently and accurately iterate them to determine the optimum pixel settings for a desired response function or change in the response function. The present invention, also provides a mechanism to use compensation pixels at the ends of the pixel array to compensate for the effects of the edges of the array where the compensation pixels are controlled in such a way as to minimize ripple in the responses of nearby active pixels.

Figure 1:
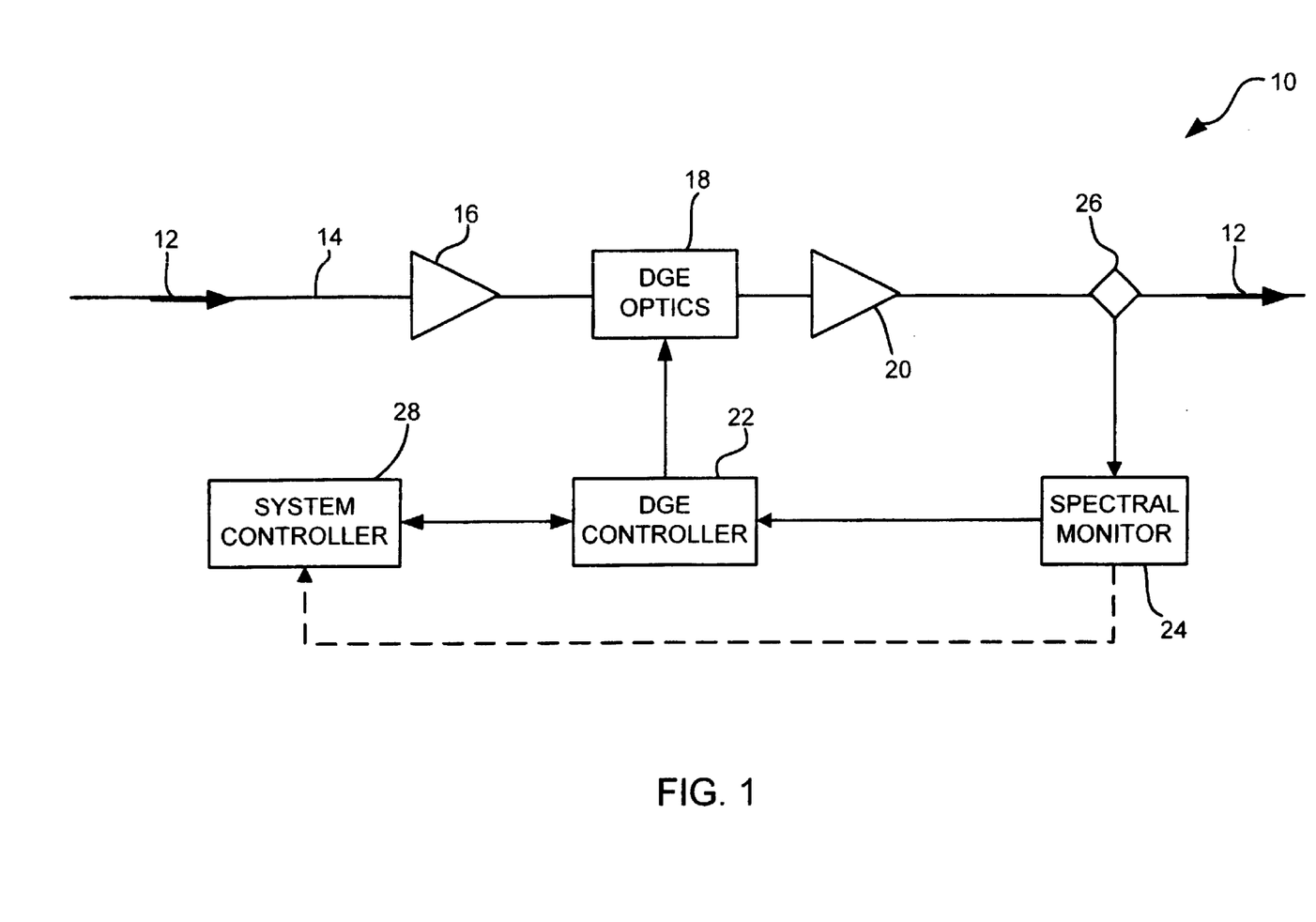
FIG. 1 is a block diagram illustration of a representative configuration for an optical amplifier with dynamic gain equalization.

FIG. 1 illustrates an example of an optical amplifier 10 having dynamic gain equalization (DGE) functionality. An optical signal 12 is propagated along a path 14 through a preamplifier 16, a DGE optics module 18 and a post amplifier 20. A DGE controller 22 provides input data to the DGE optics module 18 for use in controlling transmission characteristics. The DGE controller 22 receives input data from a spectral monitor 24 that receives input from output of the post amplifier 20 through a tap 26. The DGE controller 22 is in communication with a system controller 28. In practice, the DGE optics module 18 and the DGE controller 22 can be physically located within an amplifier package (not shown) or external to it. Further, the spectral monitor 24 is typically shared by several optical amplifiers 10 and may report directly to the system controller 28 (illustrated by the dotted line connecting the spectral monitor 24 and the system controller 28).

Figure 2:
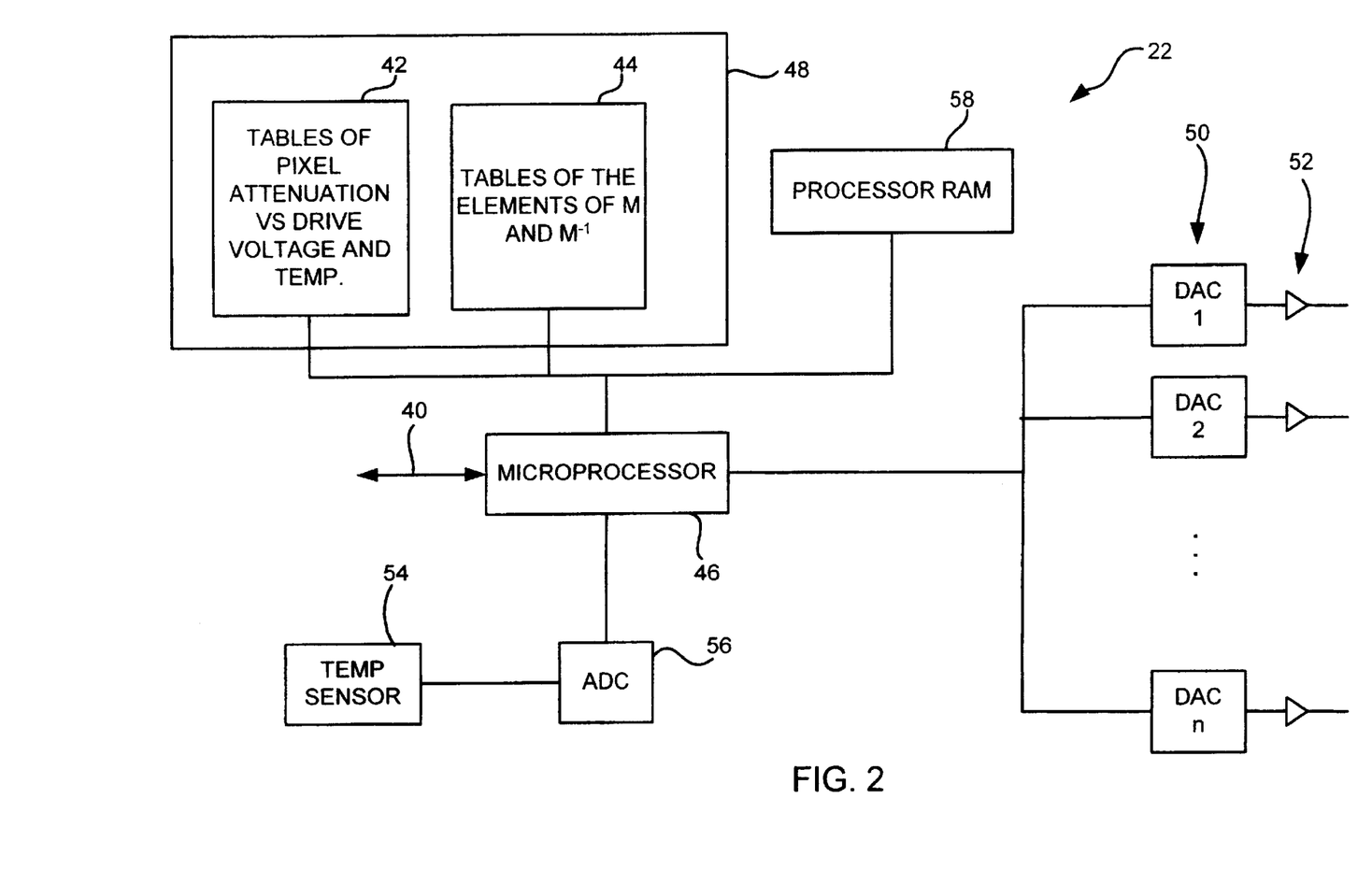
FIG. 2 is a block diagram illustration of a representative DGE controller shown in FIG. 1.

FIG. 2 is a representative example of the DGE controller 22. During startup operations, a communication link 40 is used to transfer tables of pixel attenuation versus drive voltage and temperature 42 and tables of the elements of matrices M and $M^{-1}$ 44 (the contents of which are discussed in more detail below) to a microprocessor 46, which loads them into a non-volatile memory 48. A set of digital-to-analog converters (DAC1–DACn) 50 receive digital commands from the microprocessor 46 and convert the commands into analog voltages to drive the individual pixels 52.

A temperature sensor 54, located in close proximity to a liquid-crystal cell, generates analog output that is converted into a digital signal by the analog-to-digital converter (ADC) 56. The digital representation of temperature is used by the microprocessor 46 to determine appropriate drive voltages stored in the tables 42. A processor RAM 58 is connected to the non-volatile memory 44 and the microprocessor 46 to support the operation of the DGE controller 22 by providing standard memory functions.

Figure 3:
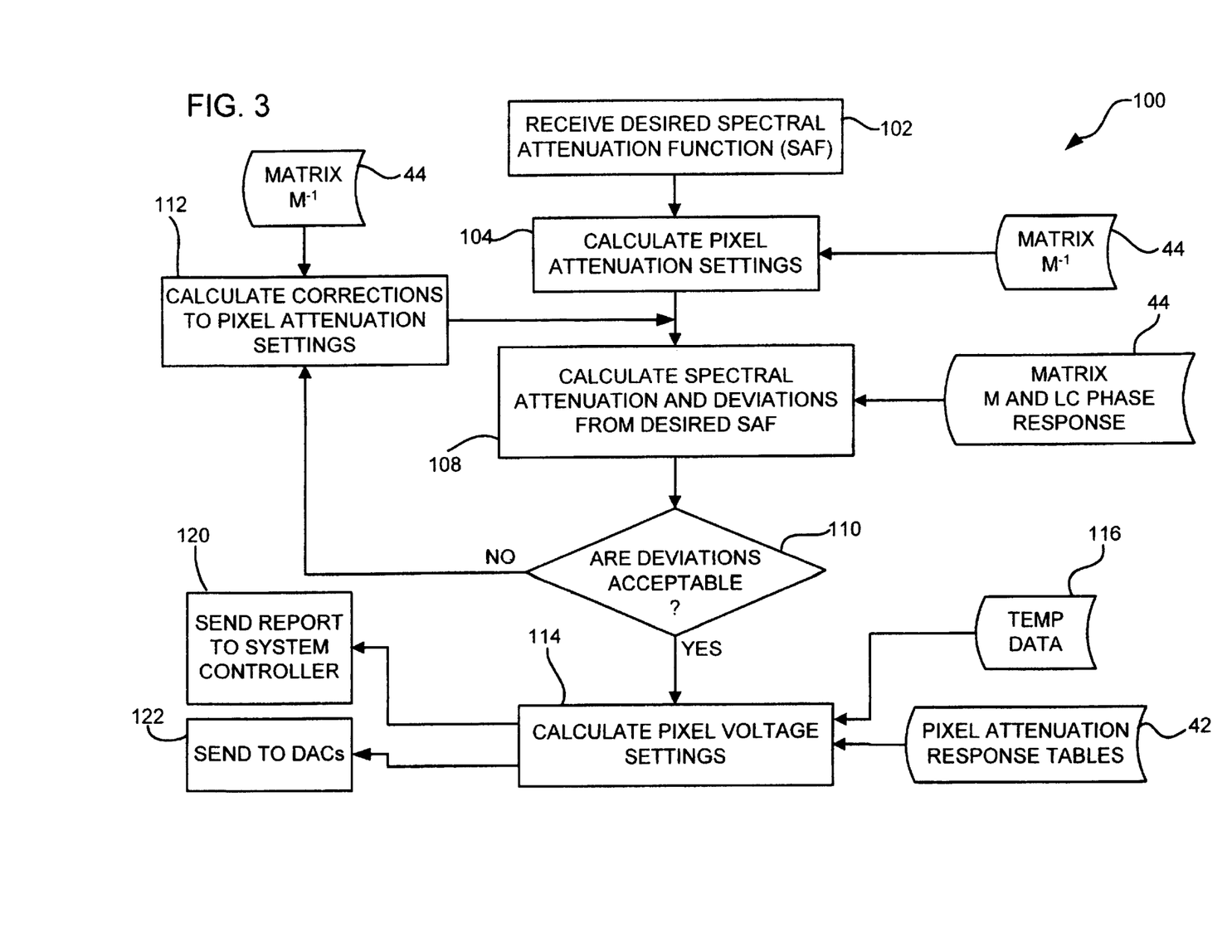
FIG. 3 is a flow diagram of a control method according to an embodiment of the present invention.

FIG. 3 is a flow diagram of a control method 100 according to an embodiment of the present invention. A desired spectral attenuation function (also termed a target response function) is received from the system controller 28 at step 102 and pixel attenuation settings are calculated at step 104 based on the matrix $M^{-1}$ 44, which is stored in the non-volatile memory 48 of the DGE controller 22.

Next, spectral attenuation and deviations from the desired spectral attenuation function (from step 102) are calculated at step 108 using the matrix M 44, which is stored in the non-volatile memory 48 of the DGE controller 22 and the liquid-crystal (LC) phase response. The LC phase response is the phase shift imposed on the light reflected from the liquid-crystal pixels as a function of the attenuation resulting from the pixel setting. This information can be included in the information on pixel attenuation versus drive voltage and temperature, which is stored in the non-volatile memory 48 of the DGE controller 22. Alternatively, it is possible to use a simple analytic expression for the phase shift as a function of pixel attenuation as is well known to those skilled in the art.

If the deviations (from the desired target response function) are not acceptable then processing proceeds to step 112 to calculate corrections to the pixel attenuation settings based on the matrix $M^{-1}$ 44. If the deviations are acceptable then processing proceeds to step 114 to calculate pixel voltage settings based on temperature sensor data 116 from the sensor 54 of the DGE controller 22 and based on the tables of pixel attenuation responses 42 (i.e., attenuation vs. drive voltage and temperature data), which are stored in the non-volatile memory 48 of the DGE controller 22. The calculated pixel voltage settings generated at step 114 are sent to the DACs(1–n) 50 of the DGE controller 22 at step 122. The DGE controller 22 also sends a report to the system controller 28 at step 120 to report that it has adjusted the attenuation function.

Figure 4A:
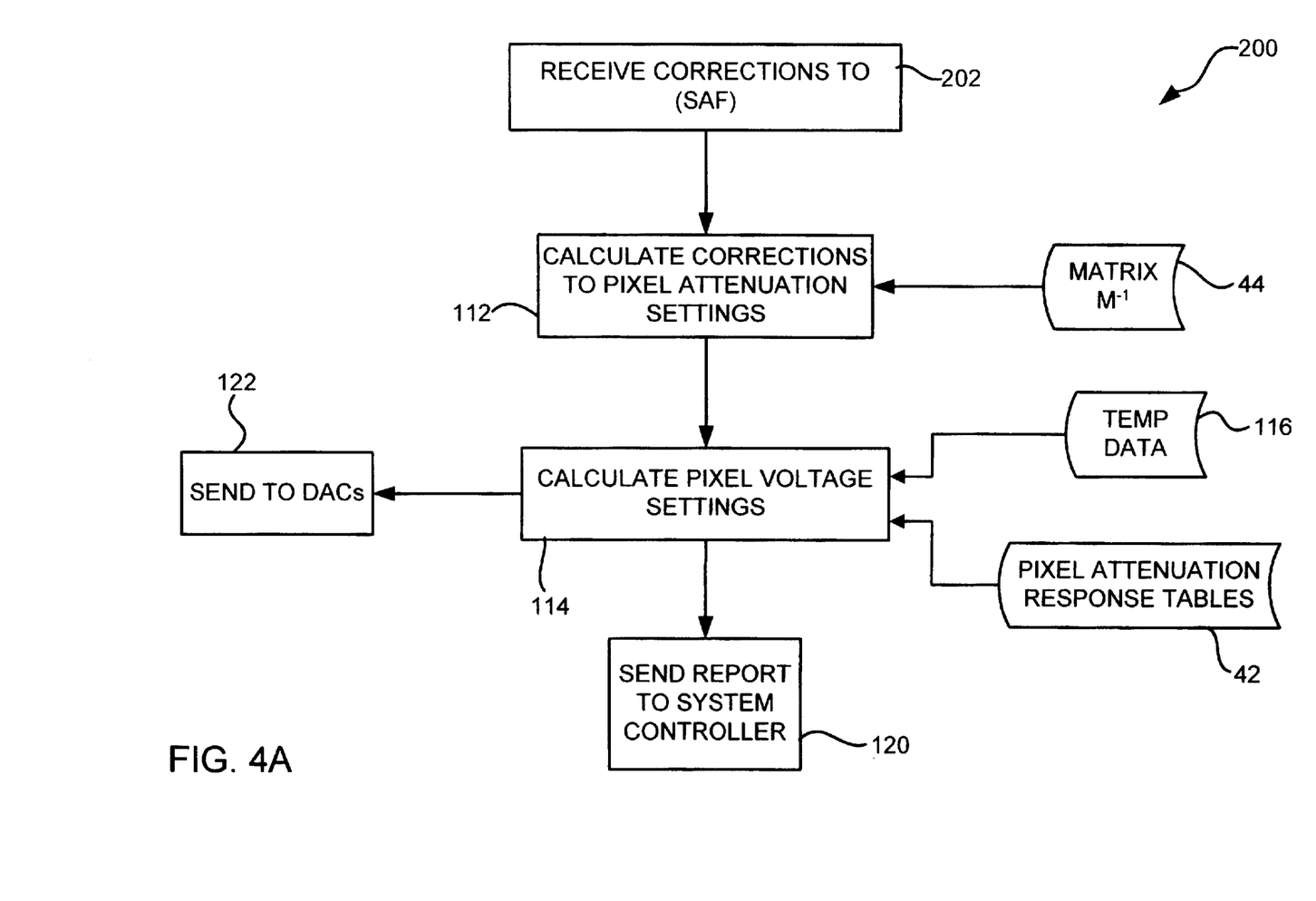
FIG. 4A is a flow diagram of the control method according the present invention operating in a differential mode.

FIG. 4A is a flow diagram of the control method of the present invention operating in a differential mode 200. Desired corrections to the spectral attenuation function are received from the system controller 28 (i.e. from control method 100—FIG. 3) at step 202. Processing proceeds to step 112 to calculate corrections to pixel attenuation settings based on matrix $M^{-1}$ 44. Next, pixel voltage settings are calculated at step 114 based on temperature sensor data 116 and based on the stored tables of pixel attenuation responses 42. The calculated pixel voltage settings, generated at step 114, are sent to the DACs(1–n) 50, and a report on the actions taken is sent to the system controller 28.

To provide a basis of comparison for the present invention, consider a simple control method for controlling the DGE controller 22 in which the desired attenuation for the wavelength centered on a pixel is used as the initial setting for the pixel attenuation. In subsequent iterations, the pixel attenuation is changed by the amount of the error for the wavelength centered on the pixel. The simple control method is adequate for investigating how the spectral resolution and pixel widths impact the ripple in the spectral response, and with evaluating the feasibility of meeting specifications for DGEs with very low ripple, but has disadvantages relative to the control method of the present invention as discussed in more detail below.

In an embodiment of the control method (100, 200) of the present invention for controlling the DCOE controller 22 (i.e., a pixilated dynamic gain controller/dynamic gain equalizer), an algorithm is provided for estimating the actual response function, so that iteration can be done without updated information from the spectral monitor 24. Furthermore, the algorithm can be adjusted to control a few pixels at the ends of the pixel array to compensate for edge effects in the array response function.

Figure 4B:
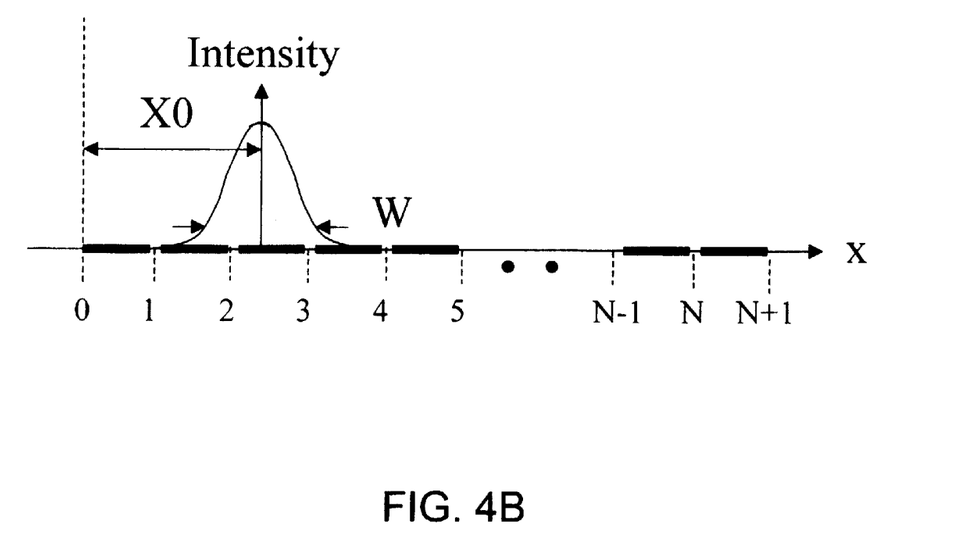
FIG. 4B provides a graphical representation of equation (1) illustrating the concept of a pixel plane.

A spectral response function of the pixilated DGE controller 22 is given by equation (1):

$$T(\lambda) = \frac{8}{\pi W^2} \left| \int r(x) \exp[-8(x - x_0(\lambda))^2 / W^2] dx \right|^2 \quad \text{EQ. (1)}$$

where $T(\lambda)$ is the spectral transmission of the DGE controller 22; W is the $e^{-2}$ intensity full width of a monochromatic input signal, at a pixel plane in a dispersion direction. measured in units of the pixel pitch; r(x) is the complex amplitude reflectivity of the pixel plane; x is the variable describing locations on the pixel plane; and $x_o(\lambda)$ is the position where the center of a beam intersects the pixel plane, for monochromatic input beam at wavelength $\lambda$. Equation (1) shows a nonlinear relationship between the pixel reflectivities, r(x), and the device transmission $T(\lambda)$. FIG. 4B provides a graphical representation of equation (1) illustrating the concept of the pixel plane in relation to the variables described above.

Equation (1) is then rewritten to equation (2) in terms of the amplitude transmission, $t(\lambda)$, rather than the intensity transmission:

$$t(\lambda) = \left(\frac{8}{\pi W^2}\right)^{1/2} \int r(x) \exp[-8(x - x_0(\lambda))^2 / W^2] dx \quad \text{EQ. (2)}$$

Equation (2) displays a linear relationship between the pixel reflectivities, r(x), and the device amplitude transmission $t(\lambda)$.

For control purposes consider a discrete set of wavelengths selected to be centered on the pixels. Since each pixel's reflectivity is constant, for the chosen set of wavelengths EQ. (2) is written in discrete form as equation (3):

$$t_j = \left(\frac{8}{\pi W^2}\right)^{1/2} \sum_{i=0}^{N-1} r_i \int_{pixel\ i} \exp[-8(x - x_0(\lambda_j))^2 / W^2] dx \quad \text{EQ. (3)}$$

for a total of N pixels and N wavelengths numbered from 0 to N−1. $t_j$ represents a set of pixel amplitude field reflectivities or transmissions.

Equation (3) is a set of linear equations rewritten in another form in equation (4):

$$t_j = \sum_{i=0}^{N-1} M_{j,i} \cdot r_i \qquad \text{EQ. (4)}$$

where, $$M_{j,i} = \left(\frac{8}{\pi W^2}\right)^{1/2} \int_{\text{pixel } i} \exp[(x - x_0(\lambda_j))^2 / W^2] dx \qquad \text{EQ. (5)}$$

The expression for the matrix (M) of EQ. (5), is rewritten by making the following changes: (a) $x_0(\lambda_j)=(j+0.5)$, and (b) changing the integration variable to $y=x-i-0.5$, which has its zero at the center of pixel i, resulting in equation (6):

$$M_{j,i} = \left(\frac{8}{\pi W^2}\right)^{1/2} \int_{-0.5+gap/2}^{0.5-gap/2} \exp[-8(y+i-j)^2/W^2] dy \qquad \text{EQ. (6)}$$

Equation (6) is further simplified to equation (7):

$$M_{j,j\pm n} = \left(\frac{8}{\pi W^2}\right)^{1/2} \int_{-0.5+gap/2}^{0.5-gap/2} \exp[-8(y\pm n)^2/W^2] dy \qquad \text{EQ. (7)}$$

In equation (7) the matrix element relating the response at wavelength j to the setting of pixel i, is independent of the wavelength, and depends only on the position of pixel i relative to the pixel where wavelength j is centered. Equations (6) and (7) provide an allowance for opaque gaps, of width "gap", between pixels. In particular, the gaps are accounted for by eliminating the gap areas from the limits on the integrals in equations (6) and (7).

Since the only parameters in the matrix M of EQ. (7) are W and gap, the mantrix elements need only be computed once for a given DGE controller 22. The matrix elements, for $|n|$ greater than approximately W, are sufficiently small that they can be neglected (e.g. for W=2 and $|n|=3$, the matrix element is only $2.4\times10^{-7}$). Furthermore, given the symmetry about the main diagonal, the integral in EQ. (7) is evaluated approximately W+1 times.

The problem of determining the pixel settings to give a desired response function involves solving the system of linear equations defined by EQs. (4) and (7). For a set of desired responses, defined as $t_j$, the required pixel settings are then defined by equation (8):

$$r_i = \sum_{j=0}^{N-1} M_{j,i}^{-1} \cdot t_j \qquad \text{EQ. (8)}$$

Pixel reflectivities are complex quantities, with a phase that depends on the magnitude of the reflectivity. Given a set of complex $r_i$'s, it call be seen from EQ. (4) that the resulting $t_j$'s will also be complex. The magnitudes of the desired $t_j$'s are known, but there is no a priori way to determine the appropriate phases such that the $r_i$'s that would be obtained from EQ. (8) will have phases consistent with the characteristics of the liquid-crystal cells.

In most cases it is expected that the reflectivity differences between adjacent pixels will be relatively small (typically less than a dB), so the phase differences between adjacent pixels will also be relatively small. Consequently, using the desired set of $t_j$'s, with phases set to zero, EQ. (8) gives a reasonable first approximation of the required magnitudes of the $r_i$'s. Each magnitude is then made complex, with the phase appropriate for its magnitude, and used with EQ.(4) to calculate the actual response function that would be obtained with those pixel settings.

Taking the differences of the magnitudes of the actual responses and the desired responses generates an error function, which can be inserted into EQ. (8) to obtain an estimate of the corrections required to the magnitudes of the $r_i$'s. Since this is a system of linear equations, they work for differences of two input variables. The same as for the variables themselves. This process can then be repeated until the magnitude of the error function converges. In an example detailed below, it is shown that, except for very sharp features in the target response function, the process effectively converges in a single iteration.

The following discussion introduces the concept of edge compensation into the control method of controlling pixilated DGE controllers according to additional feature of the present invention. Compensation pixels are generally defined as pixels that do not have signal channels centered within the pixel's area, but are sufficiently close to a pixel that does, that their reflectivity impacts the net reflectivity for signal channels.

While the above discussed control algorithms for the DGE controller 22 functions for most of the pixels in the DGE optics 18, some errors for the pixels at the ends of the pixel array in the DGE optics 18 can still occur. For wavelengths centered on pixels 0 or 1 (or N–2 or N–1), a non-negligible portion of the beam falls outside the set of pixels, and is lost (assuming W~2). To set those pixels to match a smooth target response function can, in some cases, lead to a need for a pixel reflectivity greater than unity, to replace the lost portion of the beam. Even if the target response is such that one does not need pixels with optical gain, adjusting the outer two pixels to match the target response at their centers can result in substantial ripple for intermediate wavelengths, which can extend to other pixels.

In accordance with the present invention, as an example, to compensate for these edge effects it is assumed that the outer two pixels on each end of the array (pixels 0, 1, N–2, and N–1) are compensation pixels that do not have signal beams centered on them. The control for these pixels is then designed to provide a minimum-ripple response over the full width, of the adjacent pixels (pixels 2 and N–3), with a smooth extension at least part way into pixels 1 and N–2. The actual required number of compensation pixels depends on the W parameter. The numbers provided in these examples are based on the assumption that W~2.

In an exemplary implementation, pixels 1 and N–2 are driven to minimize the error it the gap between them and pixels 2 and N–3 (respectively), and pixels 0 and N–1 are driven to minimize the error at the centers of pixels 1 and N–2 (respectively). The top and bottom two rows of the matrix are modified (see example below) and the last two points on each end of the target response function are defined for the correct wavelengths. The revised matrix elements can be calculated from EQ. (5.), using revised values of $x_0$. In some applications, the target response function may not be defined outside the region of the signal channels, but in general it is possible to determine the targets for the compensation pixels from a simple extrapolation from the targets for the outer few channels. In the example below, this approach achieves low ripple over the full widths of pixels 2 arid N–3.

EXAMPLE

To illustrate an application of the control method for pixilated dynamic gain controllers according to the present invention the following example is provided.

Initialization assumptions:

$W=2$, gap=0.03, and $N=40$.

Based on these assumptions, the upper left portion of the matrix M is shown below. The matrix M is sparse and symmetric. The top two rows of the matrix M have been modified to compensate for edge effects. In particular, the matrix elements for the first two rows (and the last two rows) are calculated using equation (5), with the $X_0$ values as defined above.

In both cases the difference (in dB) between the target response function are plotted, and the response calculated using EQ. (1). The dashed curve is for the first estimate of the required pixel reflectivities. The dotted curve shows the results from the first iteration, and the solid curve shows the results from the second iteration.

Figure 5:
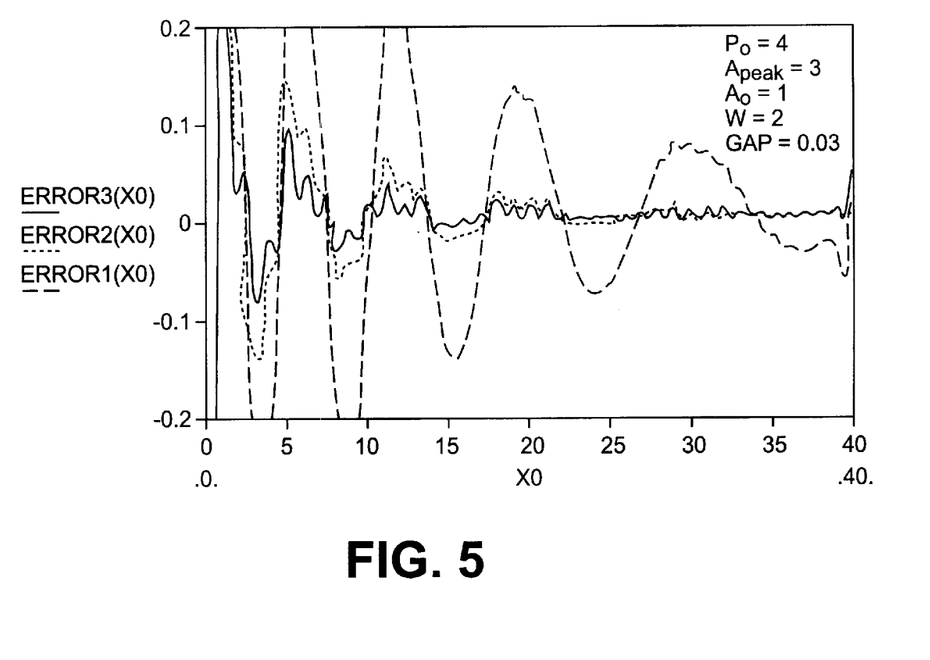
FIG. 5 illustrates error functions for a chirped sinusoid target pattern using a simple control method that does not account for the interactions between pixels (errors are in dB)
Figure 6:
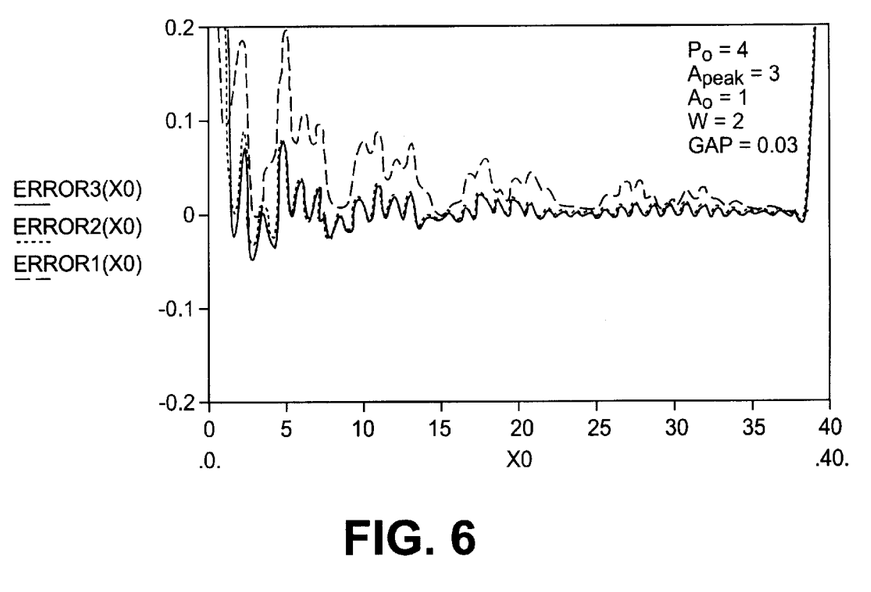
FIG. 6 illustrates error functions for a chirped sinusoid target pattern using the control method according to present invention (errors are in dB)

Comparing FIGS. 5 and 6, the first estimate is much closer to the optimum pixel setting using the control method of the present invention (results shown in FIG. 6) when compared with the simple control method results (FIG. 5). Further, the control method of the present invention enabies mathemati-

MATRIX M

|    | 0 | 1 | 2 | 3 | 4 | 5 | 6 |
|----|---|---|---|---|---|---|---|
| 0  | 0.15 | 0.668 | 0.15 | $1.222 \cdot 10^{-3}$ | 0 | 0 | 0 |
| 1  | 0.021 | 0.464 | 0.464 | 0.021 | $2.789 \cdot 10^{-5}$ | 0 | 0 |
| 2  | $1.222 \cdot 10^{-3}$ | 0.15 | 0.668 | 0.15 | $1.222 \cdot 10^{-3}$ | 0 | 0 |
| 3  | 0 | $1.222 \cdot 10^{-3}$ | 0.15 | 0.668 | 0.15 | $1.222 \cdot 10^{-3}$ | 0 |
| 4  | 0 | 0 | $1.222 \cdot 10^{-3}$ | 0.15 | 0.668 | 0.15 | $1.222 \cdot 10^{-3}$ |
| 5  | 0 | 0 | 0 | $1.222 \cdot 10^{-3}$ | 0.15 | 0.668 | 0.15 |
| 6  | 0 | 0 | 0 | 0 | $1.222 \cdot 10^{-3}$ | 0.15 | 0.668 |
| 7  | 0 | 0 | 0 | 0 | 0 | $1.222 \cdot 10^{-3}$ | 0.15 |
| 8  | 0 | 0 | 0 | 0 | 0 | 0 | $1.222 \cdot 10^{-3}$ |
| 9  | 0 | 0 | 0 | 0 | 0 | 0 | 0 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |

The upper left corner of the inverse $M^{-1}$ of the matrix M is shown below. The inverse $M^{-1}$ is basically symmetric (except for the influence of the compensation pixels in the upper few rows). However, the inverse $M^{-1}$ is significantly more populated than the original matrix M.

cal iterations (without additional system monitor input) that rapidly converge to an optimum solution. In particular, the control method of the present invention provides a significantly better initial estimate of the required pixel settings. The control method of the present invention also converges

MATRIX $M^{-1}$

|    | 0 | 1 | 2 | 3 | 4 | 5 |
|----|---|---|---|---|---|---|
| 0  | 8.8 | −15.678 | 9.285 | −1.691 | 0.383 | −0.087 |
| 1  | −0.502 | 3.711 | −2.572 | 0.486 | −0.11 | 0.025 |
| 2  | 0.102 | −0.848 | 2.172 | −0.486 | 0.111 | −0.025 |
| 3  | −0.023 | 0.194 | −0.509 | 1.695 | −0.4 | 0.091 |
| 4  | $5.281 \cdot 10^{-3}$ | −0.044 | 0.116 | −0.4 | 1.676 | −0.396 |
| 5  | $-1.205 \cdot 10^{-3}$ | 0.01 | −0.027 | 0.091 | −0.396 | 1.675 |
| 6  | $2.751 \cdot 10^{-4}$ | $-2.303 \cdot 10^{-3}$ | $6.061 \cdot 10^{-3}$ | −0.021 | 0.09 | −0.396 |
| 7  | $-6.28 \cdot 10^{-5}$ | $5.256 \cdot 10^{-4}$ | $-1.383 \cdot 10^{-3}$ | $4.767 \cdot 10^{-3}$ | −0.021 | 0.09 |
| 8  | $1.433 \cdot 10^{-5}$ | $-1.2 \cdot 10^{-4}$ | $3.158 \cdot 10^{-4}$ | $-1.088 \cdot 10^{-3}$ | $4.714 \cdot 10^{-3}$ | −0.021 |
| 9  | $-3.272 \cdot 10^{-6}$ | $2.738 \cdot 10^{-5}$ | $-7.208 \cdot 10^{-5}$ | $2.483 \cdot 10^{-4}$ | $-1.076 \cdot 10^{-3}$ | $4.711 \cdot 10^{-3}$ |
| 10 | $7.467 \cdot 10^{-7}$ | $-6.25 \cdot 10^{-6}$ | $1.645 \cdot 10^{-5}$ | $-5.668 \cdot 10^{-5}$ | $2.456 \cdot 10^{-4}$ | $-1.075 \cdot 10^{-3}$ |
| 11 | $-1.704 \cdot 10^{-7}$ | $1.427 \cdot 10^{-6}$ | $-3.755 \cdot 10^{-6}$ | $1.294 \cdot 10^{-5}$ | $-5.605 \cdot 10^{-5}$ | $2.454 \cdot 10^{-4}$ |
| 12 | $3.89 \cdot 10^{-8}$ | $-3.256 \cdot 10^{-7}$ | $8.571 \cdot 10^{-7}$ | $-2.953 \cdot 10^{-6}$ | $1.279 \cdot 10^{-5}$ | $-5.602 \cdot 10^{-5}$ |
| 13 | $-8.88 \cdot 10^{-9}$ | $7.432 \cdot 10^{-8}$ | $-1.956 \cdot 10^{-7}$ | $6.741 \cdot 10^{-7}$ | $-2.92 \cdot 10^{-6}$ | $1.279 \cdot 10^{-5}$ |
| 14 | $2.027 \cdot 10^{-9}$ | $-1.696 \cdot 10^{-8}$ | $4.465 \cdot 10^{-8}$ | $-1.539 \cdot 10^{-7}$ | $6.666 \cdot 10^{-7}$ | $-2.919 \cdot 10^{-6}$ |
| 15 | $-4.626 \cdot 10^{-10}$ | $3.872 \cdot 10^{-9}$ | $-1.019 \cdot 10^{-8}$ | $3.512 \cdot 10^{-8}$ | $-1.521 \cdot 10^{-7}$ | $6.662 \cdot 10^{-7}$ |

A chirped sinusoid is selected as a target response function for this example because it is convenient for displaying responses for a range of feature sizes in a single calculation. The following additional assumptions are made: (a) peak-to-peak amplitude=3 dB, (b) minimum loss of 1.0 dB, and (c) a period varying from about 4.5 pixels (at the low-number end) to about 13.6 pixels (at the high-number end). FIG. 5 shows the results using the simple control method discussed above (i.e., pixel interactions are ignored) for comparison purposes. FIG. 6 shows the results using the control method of the present invention discussed above in conjunction with FIGS. 3 and 4A.

more rapidly, even for the smaller feature sizes on the left side of the plot.

For example, using the control method of the present invention, for (XO) greater than about 5, there is little difference between the errors for the first and second iteration, indicating convergence in a single iteration. For (XO) less than 5, there are small differences between the errors for the two iterations. However, if the actual errors at the pixel centers, which is what the algorithm of the control method of the present invention is controlling, are examined it is found that (neglecting the two compensation pixels on each end) all of the pixels have errors of less than 0.001 dB, except for pixel 2, which has an error of 0.016 dB.

Given that the errors at the control points are essentially zero, the solid curve (FIG. 6) provides a quantitative measure of the ripple that is intrinsic in the DGE optics 22 (W and gap) and the required spectral features. Comparing the error function to the target function (plotted in FIG. 7), the ripple is larger when fitting a peak in the transmission than when fitting a transmission minimum. For the transmission peak near (XO)=30 (corresponding to a feature with a period of about 10 pixels) the peak-to-peak ripple is about 0.015 dB. For the peak near (XO)=20 (corresponding of a period of about 7.5 pixels) the ripple has increased to about 0.022 dB. For the peak near (XO)=10 (corresponding to a period of about 6 pixels) the ripple has gone up to about 0.04 dB, and it is even larger for smaller values of (XO).

Figure 7:
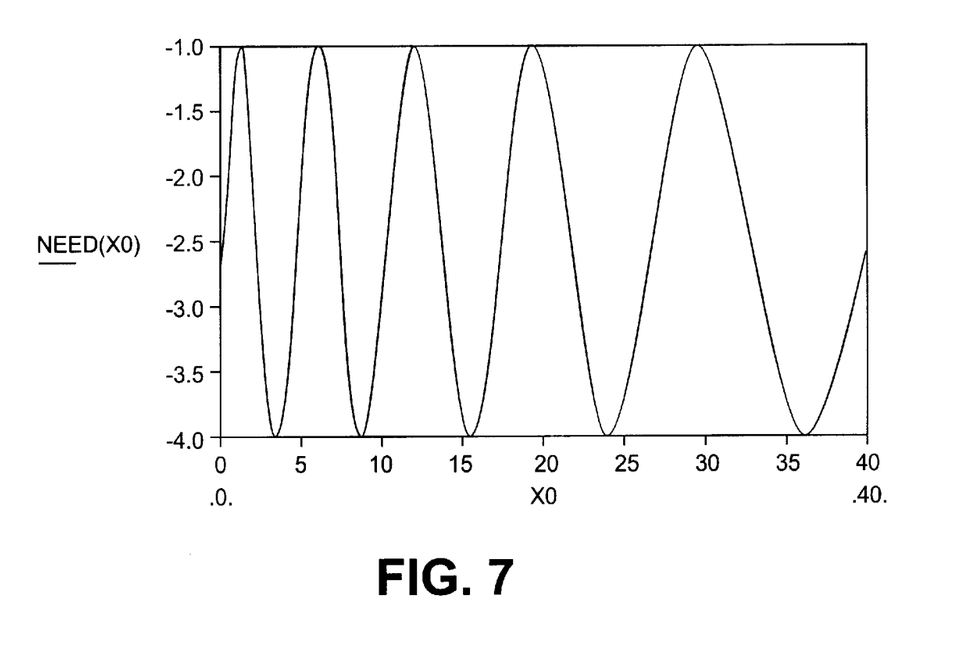
FIG. 7 is a target response function used to generate FIGS. 5 and 6, the NEED variable is the desired transmission intensity in dB.
Figure 8:
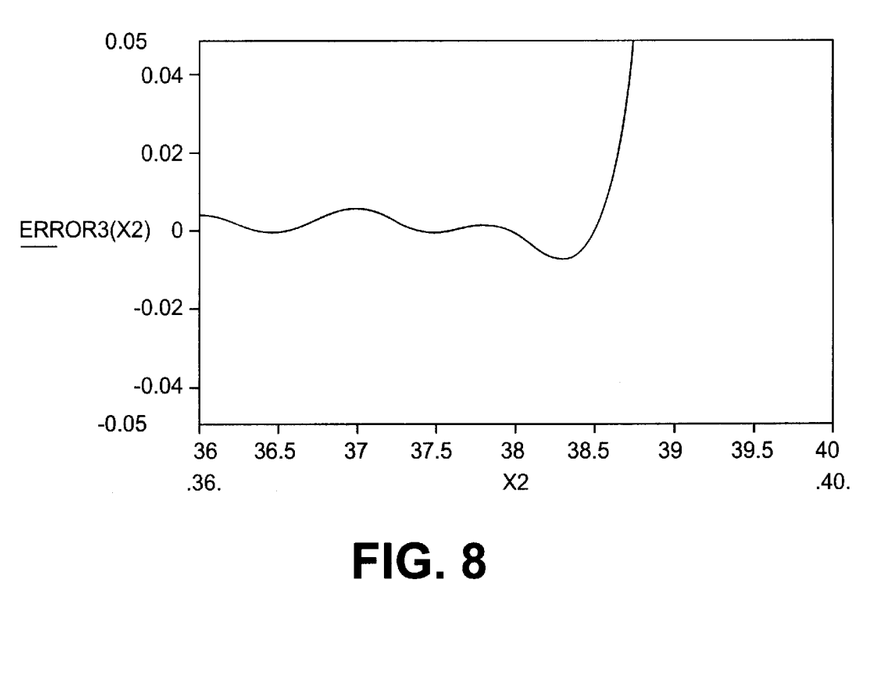
FIG. 8 is an expanded view of the error function from FIG. 6 for the last foul pixels in the array after a second iteration where X2=X0.

The right-hand end of FIG. 7 (with higher resolution) is used to examine the results achieved by the compensation pixels. FIG. 8 shows the error function after the second iteration, for the last four pixels in the array. At the control points (36.5, and 37.5, for the last two regular pixels, and 38 and 38.5 for the compensation pixels), the error is essentially zero. Over the last regular pixel (between 37 and 38), the peak-to-peak ripple is 0.007 dB. Therefore, the compensation pixels minimize the ripple over the full width of the last regular pixel. In the present example, the control points for the compensation pixels were chosen somewhat arbitrarily, and with different choices it could be possible to get a slightly lower ripple, and/or to extend the smooth response further into the first compensation pixel to reduce the dip in the error function at about 38.3. As the wavelength is increased beyond the last control point (38.5 in this example), the transmission decreases rapidly, as the beam moves off the pixel array, and this is represented in the error function by a rapidly increasing positive error.

At the other end of the array the compensation pixels are doing a similar job, but in this example the feature sizes in that region are sufficiently small that the resulting ripple is unacceptably large. In the present example, two compensation pixels at each end are used because it is assumed that W~2. If larger values of W were used additional compensation pixels may be required.

In summary, the control method of the present invention provides an efficient and accurate way of controlling pixilated dynamic gain controllers. Given an initial target response function the control method can rapidly converge to an optimized solution, without requiring additional external feedback. In ongoing operation, in which an external monitor may provide information on the differences between the current actual response and the desired response, the control method converts the differences into corrections to the pixel settings in a similarly efficient and accurate manner. By using compensating pixels (i.e., pixels located at each end of the array) according to an exemplary embodiment of the present invention, it is possible to maintain a low-ripple response over the full widths of the adjacent pixels.

While the invention has been described and illustrated in connection with preferred embodiments it is to be understood that the subject matter herein is not to be limited to those specific embodiments. On the contrary, it is intended for the subject matter of the invention to include all alternatives, modifications and equivalents as can be included within the spirit and full scope of the following claims.

What is claimed is:

1. In a system having an array of pixelated elements for controlling incident light thereon, and having a processor for processing control information related to response transmission characteristics of the array of pixelated elements, a method of controlling characteristics of the array of pixelated elements in response to input data comprising the steps of:

(a) acquiring calibration information related to the response characteristics of the array of pixelated elements;
    (b) acquiring a target response function for the array of pixelated elements;
    (c) converting the target response function into a set of pixel amplitude field linear equations; and
    (d) determining a set of input data values for controlling the array of pixelated elements based on the calibration information and the pixel amplitude field linear equations.

2. The method of claim 1, wherein the array of pixelated elements operate in transmission mode.

3. The method of claim 1, wherein the array of pixelated elements operate in reflection mode.

4. The method of claim 1, further comprising the steps of: (e) determining deviations from the desired response function based on the calibration information and the pixel amplitude field linear equations; and (f) repeating step (c) and (d) when the deviations exceed a predetermine threshold.

5. The method of claim 1, wherein the array of pixelated elements are cells of a liquid crystal display.

6. The method of claim 5, wherein the processor controls input voltage to the liquid crystal display cells in order to vary characteristics thereof.

7. The method of claim 1, wherein the array of pixelated elements includes compensation pixels located at each end of the array of pixelated elements, wherein the compensation pixels do not have signal channels centered within a first area of a selected one of the array of pixelated elements and are sufficiently close to a further selected one of the array of pixelated elements such that reflectivity of the further selected pixelated element impacts reflectivity for signal channels.

8. The method of claim 1, wherein the set of pixelated amplitude field linear equations and the set of input data values are defined by:

$$t_j = \sum_{i=0}^{N-1} M_{j,i} \cdot r_i; \quad \text{(i)}$$

$$M_{j,j\pm n} = \left(\frac{8}{\pi W^2}\right)^{1/2} \int_{-0.5+gap/2}^{0.5-gap/2} \exp[-8(y \pm n)^2/W^2] dy; \text{ and} \quad \text{(ii)}$$

$$r_i = \sum_{j=0}^{N-1} M_{j,i}^{-1} \cdot t_j, \quad \text{(iii)}$$

$t_j$ represents a set of pixel amplitude field reflectivities or transmissions, $M_{j,i}$ represents a matrix element at wavelength j to the setting of pixel i that is independent of the wavelength and depends on the position of pixel i relative to the pixel where wavelength j is centered; W is the $e^{-2}$ intensity full width of a monochromatic input signal, at a pixel plane, measured in units of pixel pitch; $r_i$ represents the set of input data values of desired pixel amplitude field reflectivities or transmissions and gap represents a gap width between pixels in the array measured in units of pixel pitch.

9. A method of controlling the optical characteristics of individual pixelated elements in a dynamic gain equalizer having an array of controllable pixelated elements, and having a processor for processing control information related to a response function of the dynamic gain equalizer, said method comprising the steps of:

acquiring a predetermined target response function for the array of pixelated elements from a system controller;

calculating initial attenuation settings for individual pixels of the array of pixelated elements based on stored data;

calculating spectral attenuation that would result from the initial attenuation settings for individual pixels and determining deviations between the initial settings and settings to satisfy said target response;

calculating input data for use by said processor to control said individual pixels if said deviations are within set limits; and sending said input data to said processor.

10. The method of claim 9, wherein said spectral information is recalculated if said deviations are not within said set limits.

11. The method of claim 10, wherein the array of pixelated elements includes compensation pixels located at each end of the array of pixelated elements, wherein the compensation pixels do not have signal channels centered within a first area of a selected one of the array of pixelated elements and are sufficiently close to a further selected one of the array of pixelated elements such that reflectivity of the further selected pixelated element impacts reflectivity for signal channels.

12. The method of claim 10, wherein the set of pixelated amplitude field linear equations and the set of input data values are defined by:

$$t_j = \sum_{i=0}^{N-1} M_{j,i} \cdot r_i; \quad \text{(i)}$$

$$M_{j,j\pm n} = \left(\frac{8}{\pi W^2}\right)^{1/2} \int_{-0.5+gap/2}^{0.5-gap/2} \exp[-8(y \pm n)^2/W^2]dy; \text{ and} \quad \text{(ii)}$$

$$r_i = \sum_{j=0}^{N-1} M_{j,i}^{-1} \cdot t_j, \quad \text{(iii)}$$

$t_j$ represents a set of pixel amplitude field reflectivities or transmissions, $M_{j,i}$ represents a matrix element at wavelength j to the setting of pixel i that is independent of the wavelength and depends on the position of pixel i relative to the pixel where wavelength j is centered; W is the $e^{-2}$ intensity full width of a monochromatic input signal, at a pixel plane, measured in units of pixel pitch; $r_i$ represents the set of input data values of desired pixel amplitude field reflectivities or transmissions and gap represents a gap width between pixels in the array measured in units of pixel pitch.

13. A computer program product for a system having an array of pixelated elements for controlling incident light thereon, and having a processor for processing control information related to response transmission characteristics of the array of pixelated elements, the computer program product comprising computer readable program code devices for controlling characteristics of the array of pixelated elements in response to input data comprising:

(a) acquiring calibration information related to the response characteristics of the array of pixelated elements;

(b) acquiring a target response function for the array of pixelated elements;

(c) converting the target response function into a set of pixel amplitude field linear equations; and (d) determining a set of input data values for controlling the array of pixelated elements based on the calibration information and the pixel amplitude field linear equations.

14. The computer program product of claim 13, further comprising (e) determining deviations from the desired response function based on the calibration information and the pixel amplitude field linear equations; and (f) repeating step (d) and (e) when the deviations exceed a predetermine threshold.

15. The computer program product of claim 13, wherein the array of pixelated elements includes compensation pixels located at each end of the array of pixelated elements, wherein the compensation pixels do not have signal channels centered within a first area of a selected one of the array of pixelated elements and are sufficiently close to a further selected one of the array of pixelated elements such that reflectivity of the further selected pixelated element impacts reflectivity for signal channels.

16. The computer program product of claim 13, wherein the set of pixelated amplitude field linear equations and the set of input data values are defined by:

$$t_j = \sum_{i=0}^{N-1} M_{j,i} \cdot r_i; \quad \text{(i)}$$

$$M_{j,j\pm n} = \left(\frac{8}{\pi W^2}\right)^{1/2} \int_{-0.5+gap/2}^{0.5-gap/2} \exp[-8(y \pm n)^2/W^2]dy; \text{ and} \quad \text{(ii)}$$

$$r_i = \sum_{j=0}^{N-1} M_{j,i}^{-1} \cdot t_j, \quad \text{(iii)}$$

where $t_j$ represents a set of pixel amplitude field reflectivities or transmissions, $M_{j,i}$ represents a matrix element at wavelength j to the setting of pixel i that is independent of the wavelength and depends on the position of pixel i relative to the pixel where wavelength j is centered; W is the $e^{-2}$ intensity full width of a monochromatic input signal, at a pixel plane, measured in units of pixel pitch; $r_i$ represents the set of input data values of desired pixel amplitude field reflectivities or transmissions and gap represents a gap width between pixels in the array measured in units of pixel pitch.

17. A computer program product for controlling the optical characteristics of individual pixelated elements in a dynamic gain equalizer having an array of controllable pixelated elements, and having a processor for processing control information related to a response function of the dynamic gain equalizer, the computer program product comprising computer readable program code devices for:

acquiring a predetermined target response function for the array of pixelated elements from a system controller;

calculating initial attenuation settings for individual pixels of the array of pixelated elements based on stored data;

calculating spectral attenuation that would result from the initial attenuation settings for individual pixels and determining deviations between the initial settings and settings to satisfy said target response;

calculating input data for use by said processor to control said individual pixels if said deviations are within set limits; and sending said input data to said processor.

18. The computer program product of claim 17, wherein said spectral information is re-calculated if said deviations are not within said set limits.

19. The computer program product of claim 17, wherein the set of pixelated amplitude field linear equations and the set of input data values are defined by:

$$t_j = \sum_{i=0}^{N-1} M_{j,i} \cdot r_i; \quad \text{(i)}$$

$$M_{j,j\pm n} = \left(\frac{8}{\pi W^2}\right)^{1/2} \int_{-0.5+gap/2}^{0.5-gap/2} \exp[-8(y \pm n)^2 / W^2] dy; \text{ and} \quad \text{(ii)}$$

$$r_i = \sum_{j=0}^{N-1} M_{j,i}^{-1} \cdot t_j, \quad \text{(iii)}$$

$t_j$ represents a set of pixel amplitude field reflectivities or transmissions, $M_{j,i}$ represents a matrix element at wavelength j to the setting of pixel i that is independent of the wavelength and depends on the position of pixel i relative to the pixel where wavelength j is centered; W is the $e^{-2}$ intensity full width of a monochromatic input signal, at a pixel plane, measured in units of pixel pitch; $r_i$ represents the set of input data values of desired pixel amplitude field reflectivities or transmissions and gap represents a gap width between pixels in the array measured in units of pixel pitch.

* * * * *